United States Patent
Wang (10) Patent No.: US 10,404,743 B2
(45) Date of Patent: Sep. 3, 2019

(54) METHOD, DEVICE, SERVER AND STORAGE MEDIUM OF DETECTING DOS/DDOS ATTACK

(71) Applicant: PING AN TECHNOLOGY (SHENZHEN) CO., LTD., Shenzhen (CN)

(72) Inventor: Yuanming Wang, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/578,448

(22) PCT Filed: Apr. 5, 2017

(86) PCT No.: PCT/CN2017/079483
§ 371 (c)(1),
(2) Date: Nov. 30, 2017

(87) PCT Pub. No.: WO2018/090544
PCT Pub. Date: May 24, 2018

(65) Prior Publication Data
US 2018/0367565 A1    Dec. 20, 2018

(30) Foreign Application Priority Data
Nov. 15, 2016  (CN) .......................... 2016 1 1005954

(51) Int. Cl.
*G06F 12/14* (2006.01)
*H04L 29/06* (2006.01)
*H04L 12/26* (2006.01)

(52) U.S. Cl.
CPC ...... *H04L 63/1458* (2013.01); *H04L 43/0876* (2013.01); *H04L 43/16* (2013.01); *H04L 63/1408* (2013.01)

(58) Field of Classification Search
None
See application file for complete search history.

(56) References Cited

U.S. PATENT DOCUMENTS 7,584,507 B1 * 9/2009 Nucci ................. H04L 63/1416
726/22
7,788,718 B1 8/2010 Fei et al.
(Continued)

FOREIGN PATENT DOCUMENTS

CN 101355463 A 1/2009
CN 101741847 A 6/2010
(Continued)

OTHER PUBLICATIONS

Examination Report dated Oct. 26, 2018 by the AU Patent Office for the corresponding AU patent application.
(Continued)

*Primary Examiner* — Brandon S Hoffman
(74) *Attorney, Agent, or Firm* — Platinum Intellectual Property LLP (57) ABSTRACT

A method of detecting a DoS/DDoS attack includes: acquiring traffic data of a preset service in a preset time period, wherein the traffic data is correspondence data between an overall traffic of the service and a time; acquiring an overall traffic threshold data of the service corresponding to different time intervals calculated according to historical traffic data of the service; wherein the larger the historical traffic data of the time interval, the larger corresponding overall traffic threshold data of the service; determining the time interval corresponding to the acquired traffic data, and finding the overall traffic threshold corresponding to the time interval according to the determined time interval; and comparing the traffic data with the found overall traffic threshold, and performing an attack detection to the service (Continued)

when a duration for which the traffic data keeps exceeding the overall traffic threshold exceeds a preset value.

12 Claims, 6 Drawing Sheets

(56) References Cited

U.S. PATENT DOCUMENTS

| | | | |
|---|---|---|---|
| 2004/0199793 A1* | 10/2004 | Wilken | H04L 29/12009 726/22 |
| 2005/0018618 A1* | 1/2005 | Mualem | H04L 63/1458 370/252 |
| 2005/0195840 A1 | 9/2005 | Krapp et al. | |
| 2006/0010389 A1 | 1/2006 | Rooney et al. | |
| 2010/0138919 A1 | 6/2010 | Peng et al. | |
| 2016/0036837 A1* | 2/2016 | Jain | H04L 63/1416 726/23 |
| 2016/0164912 A1* | 6/2016 | Del Fante | H04L 63/1416 726/23 |

FOREIGN PATENT DOCUMENTS

| | | |
|---|---|---|
| CN | 104753863 A | 7/2015 |
| CN | 106411934 A | 2/2017 |
| JP | 2010051031 A | 3/2010 |

OTHER PUBLICATIONS

Japanese Office Action dated Feb. 6, 2019 for the corresponding Japanese patent application.

* cited by examiner

METHOD, DEVICE, SERVER AND STORAGE MEDIUM OF DETECTING DOS/DDOS ATTACK

CROSS-REFERENCE TO RELATED APPLICATION

This application claims priority to Chinese Patent Application No. 201611005954.7, entitled "METHOD AND DEVICE OF DETECTING DOS/DDOS ATTACK" filed Nov. 15, 2016, the contents of which is expressly incorporated by reference herein in its entirety.

FIELD OF THE INVENTION

The present disclosure relates to the field of computer network security technology, and more particularly relates to a method, a device, a server and a storage medium of detecting a Denial of Service (DoS) or a Distributed Denial of Service (DDoS) attack.

BACKGROUND OF THE INVENTION

Denial of Service (DoS) attack and Distributed Denial of Service (DDoS) attack are a kind of network attack that prevents legitimate users from accessing the service normally. The essence of DoS/DDoS attack is to send a large number of useless messages to the target to occupy the target bandwidth and host resources, thus result in a huge malicious traffic attack. In order to ensure the network security and the normal operation of the service, an accurate and timely attack detection is essential.

The conventional method of detecting DoS/DDoS attack is to set a fixed traffic threshold based on experience, and when the traffic exceeds the set traffic threshold, the traffic is cleaned. The simple attack detection method based on the fixed traffic threshold is likely to encounter a undetected attack and an error-detected attack, which results in some issues, such as unstable service platform service caused by unnecessary cleaning of normal traffic, and malicious consumption of resources or even paralyzed system caused by undetected attack.

SUMMARY OF THE INVENTION

According to various embodiments, a method, a device, a server and a storage medium of detecting a DoS/DDoS attack are provided.

A method of detecting a DoS/DDoS attack includes:

acquiring traffic data of a preset service in a preset time period, wherein the traffic data is correspondence data between an overall traffic of the service and a time;

acquiring an overall traffic threshold data of the service corresponding to different time intervals calculated according to historical traffic data of the service; wherein the larger the historical traffic data of the time interval, the larger corresponding overall traffic threshold data of the service;

determining the time interval corresponding to the acquired traffic data, and finding the overall traffic threshold corresponding to the time interval according to the determined time interval; and comparing the traffic data with the found overall traffic threshold, and performing an attack detection to the service when a duration for which the traffic data keeps exceeding the overall traffic threshold exceeds a preset value.

A device of detecting a DoS/DDoS attack includes:

a traffic acquiring module configured to acquire traffic data of a preset service in a preset time period, wherein the traffic data is correspondence data between an overall traffic of the service and a time;

a multiple traffic threshold acquiring module configured to acquire an overall traffic threshold data of the service corresponding to different time intervals calculated according to historical traffic data of the service; wherein the larger the historical traffic data of the time interval, the larger corresponding overall traffic threshold data of the service;

a threshold comparing and determining module configured to determine the time interval corresponding to the acquired traffic data, and finding the overall traffic threshold corresponding to the time interval according to the determined time interval; and an attack traffic detecting module configured to compare the traffic data with the found overall traffic threshold, and performing an attack detection to the service when a duration for which the traffic data keeps exceeding the overall traffic threshold exceeds a preset value.

A server comprising a processor; and a memory storing instructions, which, when executed by the processor, cause the processor to perform steps including:

acquiring traffic data of a preset service in a preset time period, wherein the traffic data is correspondence data between an overall traffic of the service and a time;

acquiring an overall traffic threshold data of the service corresponding to different time intervals calculated according to historical traffic data of the service; wherein the larger the historical traffic data of the time interval, the larger corresponding overall traffic threshold data of the service;

determining the time interval corresponding to the acquired traffic data, and finding the overall traffic threshold corresponding to the time interval according to the determined time interval; and comparing the traffic data with the found overall traffic threshold, and performing an attack detection to the service when a duration for which the traffic data keeps exceeding the overall traffic threshold exceeds a preset value.

At least one non-transitory computer-readable storage medium storing computer-readable instructions that, when executed by at least one processors, cause the at least one processor to perform steps including:

acquiring traffic data of a preset service in a preset time period, wherein the traffic data is correspondence data between an overall traffic of the service and a time;

acquiring an overall traffic threshold data of the service corresponding to different time intervals calculated according to historical traffic data of the service; wherein the larger the historical traffic data of the time interval, the larger corresponding overall traffic threshold data of the service;

determining the time interval corresponding to the acquired traffic data, and finding the overall traffic threshold corresponding to the time interval according to the determined time interval; and comparing the traffic data with the found overall traffic threshold, and performing an attack detection to the service when a duration for which the traffic data keeps exceeding the overall traffic threshold exceeds a preset value.

The details of at least one embodiments of the present disclosure will be described with reference to the following drawings and description. Other characteristic, purposes and advantages of the present disclosure will be more apparent from the specification, drawing and claims.

The details of at least one embodiments of the present disclosure will be described with reference to the following drawings and description. Other characteristic, purposes and advantages of the present disclosure will be more apparent from the specification, drawing and claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that the disclosure will be thorough and complete, and will fully convey the scope of the invention to those skilled in the art.

Figure 1:
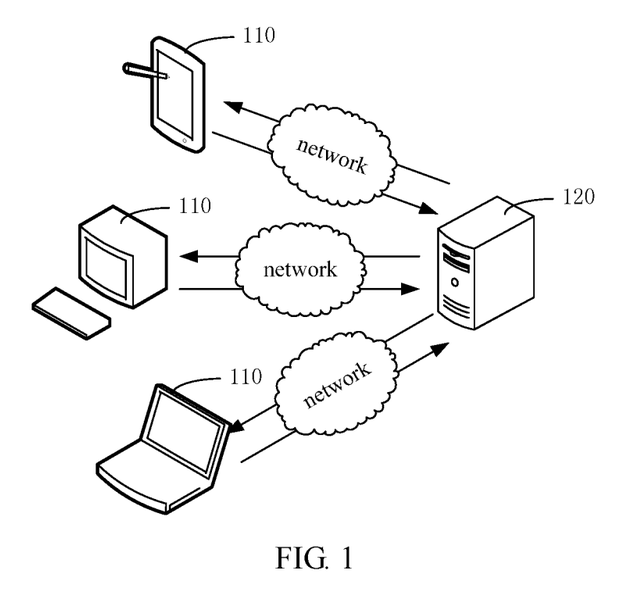
FIG. 1 is a diagram illustrating an environment for a method of detecting a DoS/DDoS attack according to one embodiment.

Referring to FIG. 1, according to an embodiment, a diagram illustrating an environment for a method of detecting a DoS/DDoS attack is provided, which includes a terminal 110 and a server 120. The terminal 110 can be at least one of a smartphone, a tablet computer, a notebook computer, a desktop computer, but not limited hereto. The server 120 can be a separate physical server or a server cluster of multiple physical servers. The terminal 110 acquires an operation event, i.e., user behavior information, that the user acts on the service terminal page, and uploads the acquired user behavior information to the server to obtain a server response. The server 120 records the user behavior information uploaded by the terminal and calculates traffic data of the service according to the user behavior information. The server 120 performs statistics of the traffic data to obtain the traffic thresholds for different time intervals, and the server 120 monitors the current traffic at different time intervals. When the service traffic exceeds the traffic threshold of the time interval, it is determined that the service has generated an attack traffic.

Figure 2:
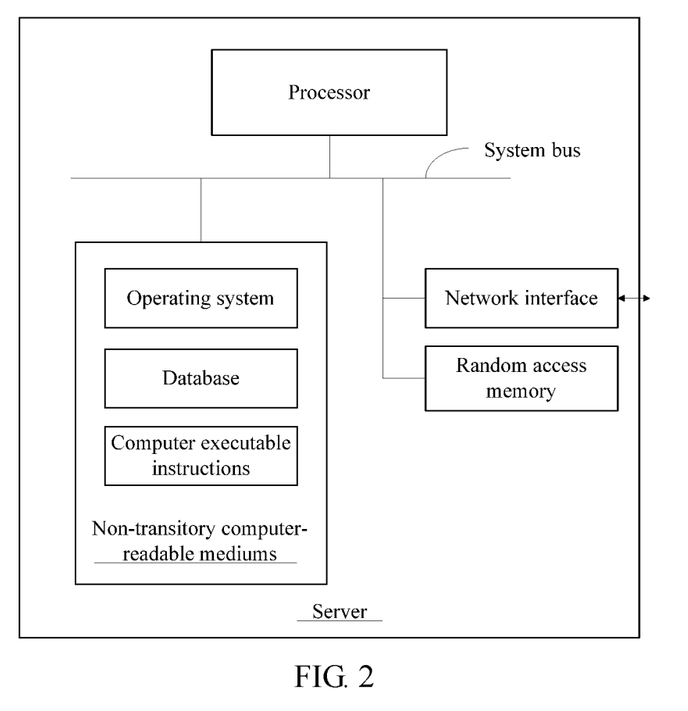
FIG. 2 is a block diagram of a server according to one embodiment.

FIG. 2 is a block diagram of the server 120 according to one embodiment. The server 120 includes a processor, a non-transitory storage medium, a random-access memory (RAM), a network interface, which are coupled via a system bus. The non-transitory storage medium of the server 120 stores an operating system, a data base, and at least one computer-readable instruction. When the computer-readable instruction is executed by the processor, cause the processor to perform a method of detecting a DoS/DDoS attack shown in FIG. 3. The database is used to collect and store data, such as the service traffic data involved in the execution of the DoS/DDoS attack detection method. The processor is used to provide computation and control capabilities to support the entire operation of the server 120. The RAM of the server provides an operation environment for a device of detecting the DoS/DDoS attack in the non-transitory storage medium. The network interface is used to communicate with the external terminal 110. Persons skilled in the art can understand that, the structure shown in FIG. 2 is only a part of the structure of the solution of the present disclosure, which does not impose limitation to the server. The specific server can include components more or less than those shown in the drawing, or can combine some components, or can have different component deployments.

Figure 3:
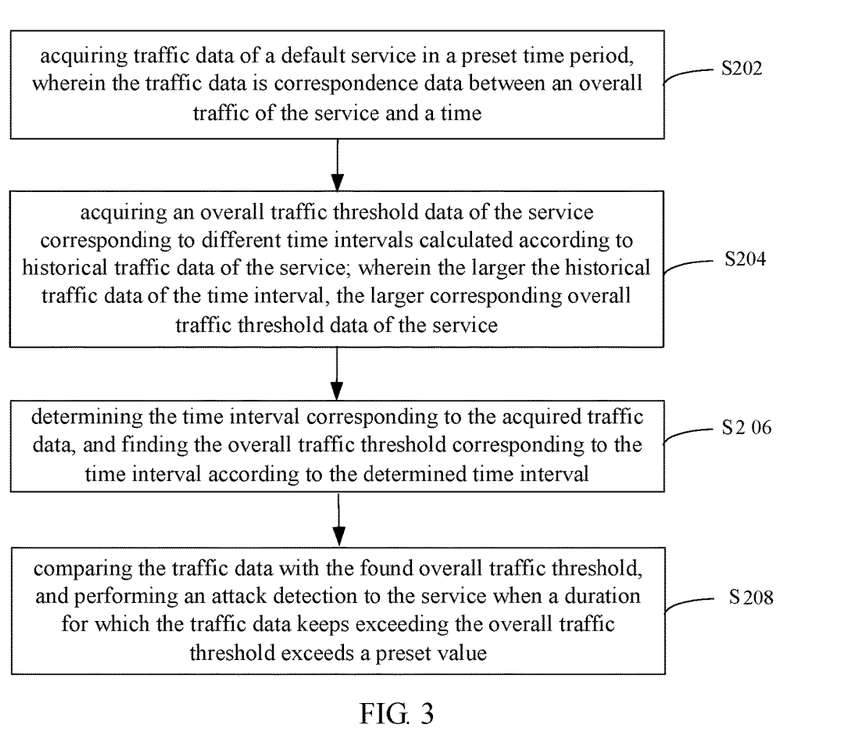
FIG. 3 is a flow chart of a method of detecting a DoS/DDoS attack according to one embodiment.

Referring to FIG. 3, in one embodiment, the method of detecting the DoS/DDoS attack is provided, which includes the following steps:

In step S202, traffic data of a preset service in a preset time period is acquired, wherein the traffic data is correspondence data between an overall traffic of the service and a time.

The service used herein refers to online websites, applications, etc., which can be used to achieve specific full functionality by computer programs. When the service system responds to user access to a service front page and the user operates in the service front page of the other events, service bandwidth and computing resources will be occupied, the occupied bandwidth and computing resources can be referred as the traffic of the service.

For example, the service can be a game forum, a financial application, etc. When the user of the terminal logs into the game forum or financial application and performs a series of other operations, the service traffic of the service will be produced.

In one embodiment, user behavior information can be collected in a number of key nodes or log records in a computer network system, and the traffic data of the service can be calculated according to the user behavior information.

Specifically, the server acquires the traffic data in the preset time period at every preset time, for example, the server acquires the traffic data within 10 minutes at every 10 minutes. The traffic data contains the corresponding time information, i.e., the traffic data is correspondence data between the overall traffic of the service and the time. The time herein can be a specific time period of day, such as 8:00 to 8:10 am; the traffic data can also include week information, such as the overall traffic of the service of Monday morning 8:00 to 8:10.

It should be noted that, the preset time period for acquiring traffic data can be configured according to the timeliness of the attack detection. When there is a need for rapid detection of attacks, the length of the preset time period can be reduced, and the frequency of access to traffic data can be increased.

In step S204, an overall traffic threshold data of the service corresponding to different time intervals is acquired, which is calculated according to historical traffic data of the service; wherein the larger the historical traffic data of the time interval, the larger corresponding overall traffic threshold data of the service.

Specifically, the server analyzes and counts the traffic characteristics of the service in advance according to the historical traffic data of the service, and the overall traffic threshold of the service is configured according to the traffic characteristics of the service. In the illustrated embodiment, the acquired overall traffic threshold data of the service calculated according to the historical traffic data is a plurality of overall traffic thresholds corresponding to different time intervals. For example, when the overall traffic threshold data of the service indicates that, there are differences between the overall traffic corresponding to 8:00-10:00, 10:00-15:00, 15:00-18:00, 18:00-24:00, and 24:00-8:00, the intervals are then configured as the traffic threshold intervals (the traffic threshold intervals corresponding to different services are different) and the corresponding overall traffic threshold is calculated according to the traffic data corresponding to each traffic threshold intervals. The larger the historical traffic data in the interval, the larger overall traffic threshold configured for the interval.

In one embodiment, the traffic threshold data also distinguishes the week attribute, i.e., different week attributes correspond to different overall traffic threshold data. For example, each traffic threshold interval of Monday to Friday is different from each traffic threshold interval of Saturday to Sunday, and the overall traffic threshold corresponding to the traffic threshold interval is not the same. In one embodiment, one can also distinguish the daily traffic threshold interval and the overall traffic threshold for each day in a week according to the historical traffic data.

It should be noted that, the historical traffic data for the overall traffic threshold calculation does not include abnormal historical traffic of the attack that occurred within the historical time.

In step S206, the time interval corresponding to the acquired traffic data is determined, and the overall traffic threshold corresponding to the time interval is found according to the determined time interval.

Specifically, the traffic threshold interval to which the time corresponding to the acquired traffic data belongs is determined, and the overall traffic threshold corresponding to the traffic threshold interval is found. For example, when the time period of the acquired traffic data corresponds to a traffic threshold interval A, then the pre-calculated overall traffic threshold corresponding to the traffic threshold interval A is configured as a contrast threshold of a current acquired traffic.

In one embodiment, when the time of the acquired traffic data corresponds to two traffic threshold intervals, the overall traffic threshold corresponding to the two traffic threshold intervals are found, respectively. The overall traffic data in the first traffic threshold interval is compared with the first traffic threshold, and the overall traffic data in the second traffic threshold interval is compared with the second traffic threshold.

In step S208, the traffic data is compared with the found overall traffic threshold, and when a duration for which the traffic data keeps exceeding the overall traffic threshold exceeds a preset value, an attack detection is performed to the service.

After determining the overall traffic threshold to be compared, the acquired traffic data is compared with the determined overall traffic threshold. When detecting that the acquired current traffic data exceeds the overall traffic threshold and lasts for a preset time, it is determined that the attack traffic is detected, and an attack traffic locating and a handling program are activated.

In one embodiment, when detecting that the acquired current traffic data exceeds the overall traffic threshold and last for a preset time, a traffic attack alarm is produced.

In the illustrated embodiment, a plurality of traffic thresholds are configured for different time intervals. The configured plurality of traffic thresholds can better reflect the traffic characteristics of the service in the time interval, and the multiple traffic threshold of different time intervals can make the traffic detection more accurate, thus effectively avoiding the phenomenon of error detection and missed detection.

In one embodiment, in step S204 of acquiring the overall traffic threshold data of the service corresponding to different time intervals calculated according to historical traffic data of the service, the overall traffic threshold data of the service corresponding to different time intervals is acquired by calculation according to the historical traffic data of the service and the computing resource data allocated for the service. The larger the historical traffic data of the service, the larger the computing resource data allocated for the service, and the larger the acquired overall traffic threshold data of the service.

Specifically, firstly, the historical traffic data of the service is statistically analyzed, an intermediate traffic threshold corresponding to the different time intervals is calculated off-line. The intermediate traffic threshold is an empirical estimate of the service overall traffic in a non-attack status directly calculated according to the historical traffic data. Secondly, the computing resource data allocated for the current service is acquired, and the intermediate traffic threshold is adjusted according to the computing resource data to obtain the finally confirmed overall traffic threshold. The finally confirmed overall traffic threshold is no less than the intermediate traffic threshold. The greater the computing resources represented by the computing resource data, the higher the magnitude of the adjustment of the intermediate traffic threshold.

For example, the intermediate traffic threshold data calculated from the historical traffic data can be as follows: an intermediate traffic threshold for time interval A is 100 G; an intermediate traffic threshold for time interval B is 150 G. If the load traffic of the computing resource allocated to the service is 300 G, then the overall traffic threshold corresponding to the time interval A is adjusted to be 200 G, and the overall traffic threshold corresponding to the time interval B is 300 G i.e., the determined overall traffic threshold is twice of the intermediate traffic threshold. If the load traffic of the computing resource allocated to the service is 200 G, then the overall traffic threshold corresponding to the time interval A is adjusted to be 150 G, and the overall traffic threshold corresponding to the time interval B is 200 G.

The aforementioned adjustment rule is to adjust the maximum intermediate traffic threshold to be the load traffic that the computing resource can afford. The adjustment ratio is calculated, and other intermediate traffic threshold is adjusted according to the ratio. Of course, other adjustment rules can be employed, as long as the adjusted overall traffic threshold does not exceed the load traffic that the computing resource can afford.

In the illustrated embodiment, the traffic threshold is adjusted according to the computing resource data allocated for the current service, in the case of sufficient computing resources, the traffic threshold is increased as much as possible, so as to reduce the chance of detection of the attack traffic, which to a certain extent can reduce the impact to the normal service operations by the traffic cleaning.

Figure 4:
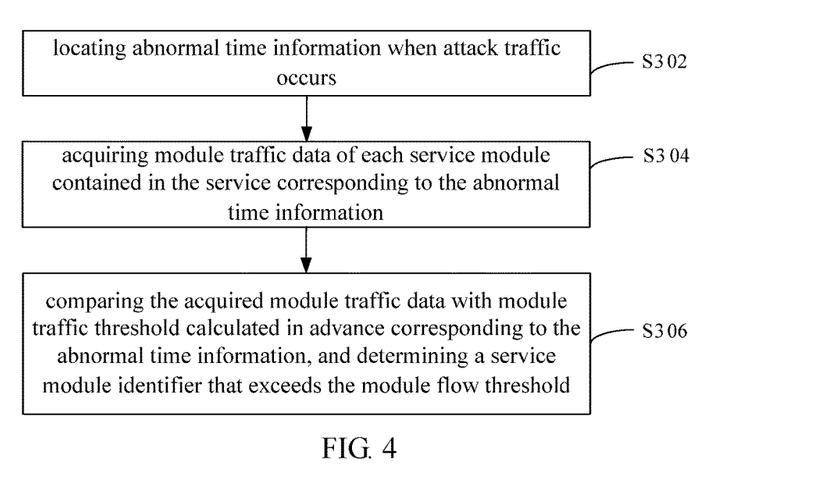
FIG. 4 is a flow chart involving the step of locating attack traffic according to one embodiment.

In one embodiment, referring to FIG. 4, step S208 of comparing the traffic data with the found overall traffic threshold, and performing an attack detection to the service when a duration of the traffic data continuing to exceed the overall traffic threshold exceeds a preset value, includes the follows:

In step S302, abnormal time information is located when attack traffic occurs.

The abnormal time refers to a time interval corresponding to the overall traffic data that exceeds the overall traffic threshold. In one embodiment, the abnormal time can also be the starting time of the attack traffic.

In step S304, module traffic data of each service module contained in the service corresponding to the abnormal time information is acquired.

Specifically, a service module identifier included in the service is acquired, and the module traffic data under each service module identifier corresponding to the abnormal time information is acquired.

In step S306, the acquired module traffic data is compared with module traffic threshold calculated in advance corresponding to the abnormal time information, and a service module identifier that exceeds the module flow threshold is determined, wherein the module traffic threshold corresponding to the abnormal time information is calculated according to the historical traffic data of each service module.

Specifically, when acquiring the module traffic data of each module in the abnormal time, the module traffic threshold for each module corresponding to the abnormal time is also acquired. The acquired module traffic threshold for each module is calculated in advance according to the historical traffic data of each module. Similar to the aforementioned calculation method of the overall traffic threshold, the module traffic threshold of each module is also a multi-threshold of different time intervals.

By comparing the module traffic data corresponding to the abnormal time and the module traffic threshold calculated in advance, the module identifier that exceeds the preset threshold is located, and the traffic produced by the module during the abnormal time is the attack traffic. After locating the attack traffic, the attack traffic can be cleaned.

Taking a service of a game forum as an example, assuming that the game forum includes a login module, a post module, and a gold exchange module. The module traffic data of each foregoing module in the abnormal time interval is acquired, and the traffic threshold for each module corresponding to the abnormal time is also acquired. The module traffic data is compared with the traffic threshold, when it is detected that the traffic data of the gold exchange module is much greater than the traffic threshold of the module, it is determined that the gold exchange module is subjected to a traffic attack. The traffic of the gold exchange module can then be cleaned, and the attack source information can be detected.

In one embodiment, the attack source information that generates the attack traffic can be obtained according to a depth learning method based on the characteristics of the attack traffic.

Figure 5:
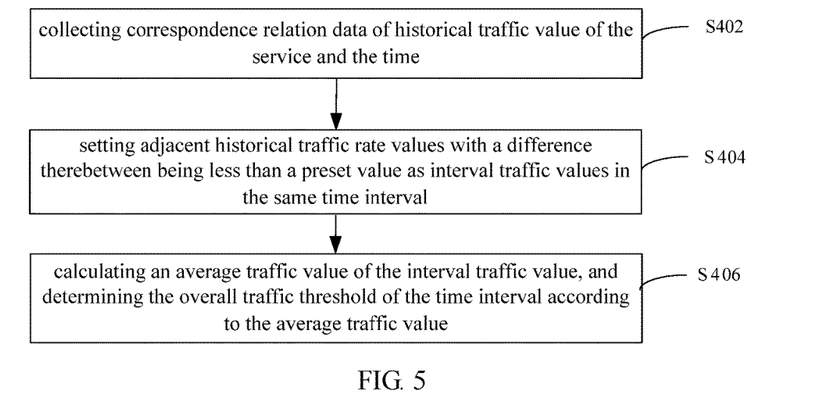
FIG. 5 is a flow chart involving the step of preparing the overall traffic threshold data of different time intervals according to one embodiment.

In one embodiment, referring to FIG. 5, the method of detecting the DoS/DDoS attack further includes the following steps:

In step S402, correspondence relation data of historical traffic value of the service and the time is collected.

In step S404, the adjacent historical traffic rate values with a difference therebetween being less than a preset value is set as an interval traffic value of the same time interval.

In step S406, an average traffic value of the interval traffic value is calculated, and the overall traffic threshold of the time interval according to the average traffic value is determined.

Specifically, the historical traffic data in the historical time is collected, which is the correspondence data between the historical traffic and the time.

Using a 24-hours as a time period, the traffic data characteristics of the acquired historical traffic data in each time period is analyzed. Specifically, the adjacent time points in the time period whose traffic difference is less than the preset value of the historical traffic data are divided into the same time interval.

Further, the plurality of time periods are acquired to perform analysis of traffic data characteristics, so as to find the time interval rule for the traffic, thus facilitating more accurate time interval division.

After finishing the time interval division, the historical traffic value in the time interval is acquired, and an average traffic value of all of the historical traffic value in the time interval is calculated, and the overall traffic threshold of the time interval is determined according to the calculated average traffic value. The determined overall traffic threshold is no less than the average traffic in the calculated time interval.

In one embodiment, prior to calculating the average traffic value, the maximum historical traffic value and the minimum historical traffic value in the time interval are removed, and the average traffic value of the historical traffic values other than the maximum historical traffic value and the minimum historical traffic value is determined as the basis of the overall traffic threshold.

In one embodiment, prior to the step S204 of the acquiring the overall traffic threshold data of the service corresponding to different time intervals calculated according to historical traffic data of the service; wherein the larger the historical traffic data of the time interval, the larger corresponding overall traffic threshold data of the service, the method further includes:

acquiring the computing resource data allocated for the service, and determining a maximum traffic threshold according to the computing resource data; and adjusting the overall traffic threshold data of the service corresponding to different intervals according to the determined maximum traffic threshold.

The overall traffic threshold data corresponding to different time intervals obtained in step S204 is the adjusted overall traffic threshold data.

In the illustrated embodiment, the traffic threshold is adjusted according to the computing resource data allocated for the current service. In the case of sufficient computing resources, the traffic threshold is increased as much as possible, so as to reduce the chance of detection of the attack traffic, which to a certain extent can reduce the impact to the normal service operations by the traffic cleaning.

Figure 6:
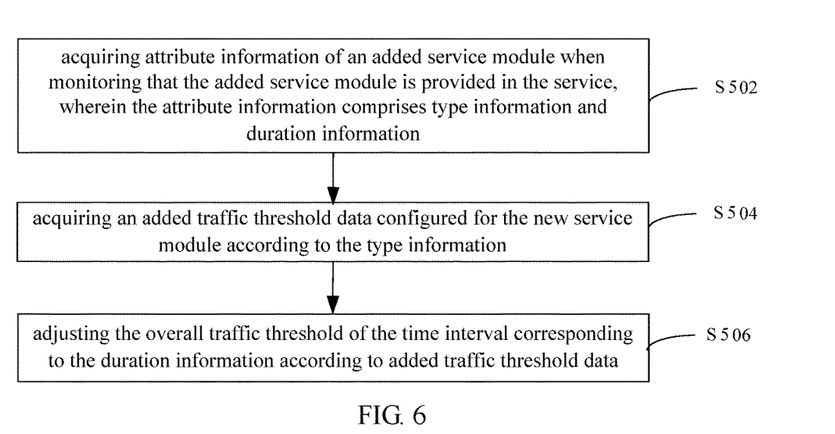
FIG. 6 is a flow chart involving adjusting the overall traffic threshold by a newly added service module according to one embodiment.

In one embodiment, referring to FIG. 6, the method of detecting the DoS/DDoS attack further includes the following steps:

In step S502, when monitoring that a newly added service module is provided in the service, attribute information of the newly added new service module is acquired, wherein the attribute information includes type information and duration information.

The server pre-stores a variety of types of new service module, when a new module is released, the corresponding type information is assigned to the newly added module. For example, the types of service modules can include advertising type, lottery type, and so on. The duration information in the newly added service module attribute can be a starting time information and an ending time information of the service module.

In step S504, newly added traffic threshold data configured for the new service module is acquired according to the type information.

The server pre-configures the corresponding newly added traffic threshold data for each newly added service module type. Specifically, the configured newly added traffic threshold can be determined according to the historical traffic data for the same type of service module.

In step S506, the overall traffic threshold of the time interval corresponding to the duration information is adjusted according to the newly added traffic threshold data.

The duration information of the newly added service module is matched with the time interval, and the newly added traffic threshold data is added to the overall traffic threshold matching the time interval, such that the overall traffic threshold for the time interval can reflect the traffic of the newly added service module. The overall traffic threshold can be dynamically adjusted according to the increase or decrease of the service module, which can avoid the situation of the error attack caused by the traffic of the new module.

Figure 7:
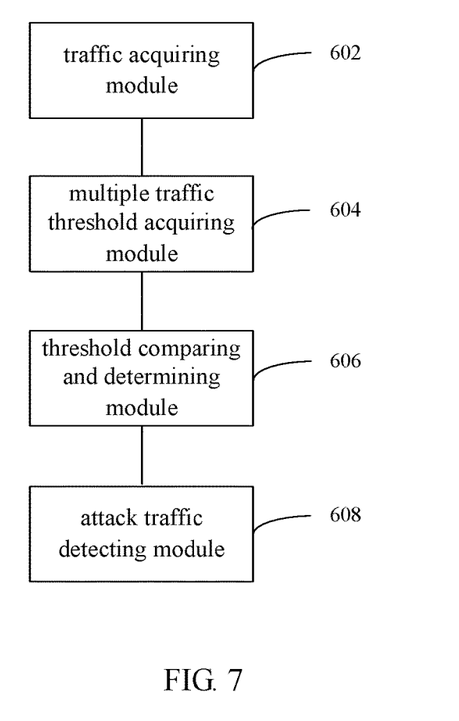
FIG. 7 is block diagram of a device of detecting a DoS/DDoS attack according to one embodiment.

In one embodiment, referring to FIG. 7, a device of detecting a DoS/DDoS attack is provided, which includes the followings:

A traffic acquiring module 602 is configured to acquire traffic data of a preset service in a preset time period, wherein the traffic data is correspondence data between an overall traffic of the service and a time.

A multiple traffic threshold acquiring module 604 is acquiring module configured to acquire an overall traffic threshold data of the service corresponding to different time intervals calculated according to historical traffic data of the service; wherein the larger the historical traffic data of the time interval, the larger corresponding overall traffic threshold data of the service.

A threshold comparing and determining module 606 is configured to determine the time interval corresponding to the acquired traffic data, and finding the overall traffic threshold corresponding to the time interval according to the determined time interval.

An attack traffic detecting module 608 is configured to compare the traffic data with the found overall traffic threshold, and performing an attack detection to the service when a duration of the traffic data continuing to exceed the overall traffic threshold exceeds a preset value.

In one embodiment, the overall traffic threshold data of the service corresponding to different time intervals is acquired by calculation according to the historical traffic data of the service and the computing resource data allocated for the service, wherein the larger the historical traffic data of the service, the larger the computing resource data allocated for the service, and the larger the acquired overall traffic threshold data of the service.

In one embodiment, the attack traffic detecting module 608 is further configured to locate abnormal time information when attack traffic occurs; acquire module traffic data of each service module contained in the service corresponding to the abnormal time information; and compare the acquired module traffic data with module traffic threshold calculated in advance corresponding to the abnormal time information, and determine a service module identifier that exceeds the module flow threshold; wherein the module traffic threshold corresponding to the abnormal time information is calculated according to the historical traffic data of each service module.

Figure 8:
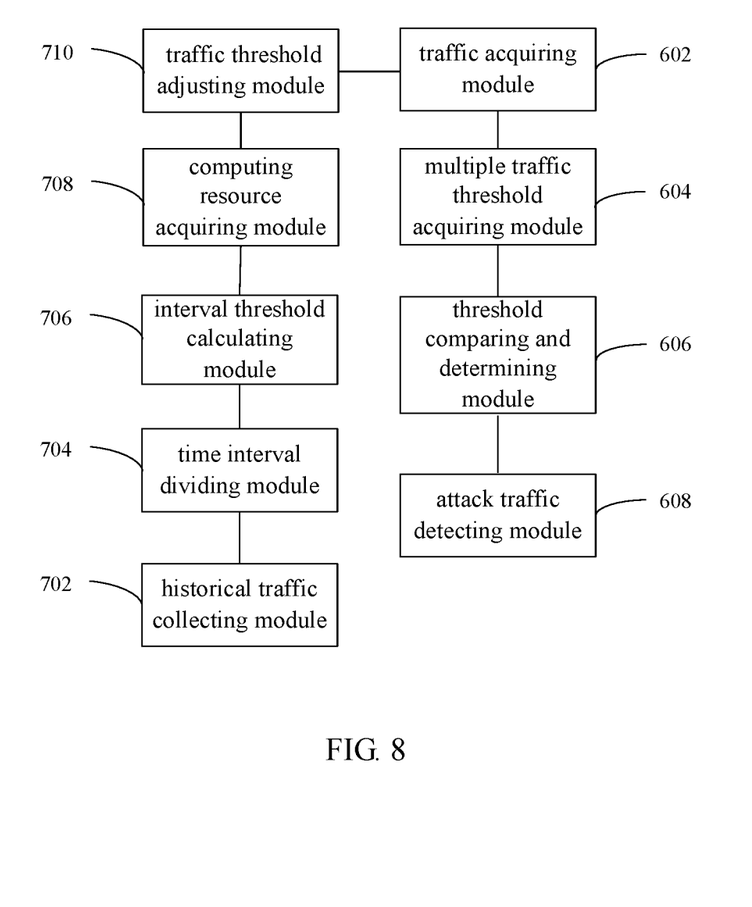
FIG. 8 is block diagram of a device of detecting a DoS/DDoS attack according to another embodiment.

In one embodiment, referring to FIG. 8, the device of detecting a DoS/DDoS attack further includes:

A historical traffic collecting module 702 is configured to collect correspondence relation data of historical traffic value of the service and the time.

A time interval dividing module 704 is configured to configure the historical traffic rate values which are adjacent and a difference thereof is less than a preset value as an interval traffic value of the same time interval.

An interval threshold calculating module 706 is configured to calculate an average traffic value of the interval traffic value, and determining the overall traffic threshold of the time interval according to the average traffic value.

A computing resource acquiring module 708 is configured to acquire the computing resource data allocated for the service.

A traffic threshold adjusting module 710 is configured to adjust the overall traffic threshold data of the service corresponding to different intervals according to the determined maximum traffic threshold.

Figure 9:
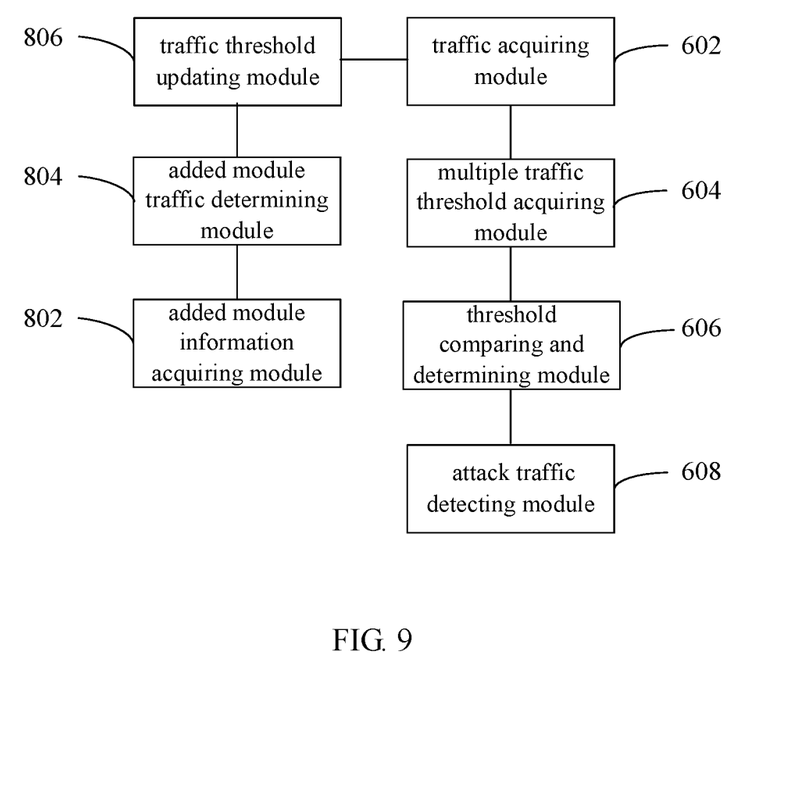
FIG. 9 is block diagram of a device of detecting a DoS/DDoS attack according to yet another embodiment.

In one embodiment, referring to FIG. 9, the device of detecting a DoS/DDoS attack further includes:

A newly added module information acquiring module 802 is configured to acquire attribute information of the newly added service module when monitoring that the newly added service module is provided in the service, wherein the attribute information comprises type information and duration information.

A newly added module traffic determining module 804 is configured to acquire a newly added traffic threshold data configured for the new service module according to the type information.

A traffic threshold updating module 806 is configured to adjust the overall traffic threshold of the time interval corresponding to the duration information according to the newly added traffic threshold data.

A person skilled in the art should understand that the processes of the methods in the above embodiments can be, in full or in part, implemented by computer programs instructing underlying hardware, the programs can be stored in a computer-readable storage medium. In an embodiment of the invention, the program may be stored in a storage medium of a computer system and executed by at least one processor in the computer system to implement a process of an embodiment as described above. The storage medium can be a disk, a CD, a Read-Only Memory (ROM) and a Random Access Memory (RAM) and so on.

The various modules of the foregoing device of detecting the DoS/DDoS attack can be implemented, in part or as a whole, by software, hardware or the combinations thereof. The foregoing modules can be embedded in or independent from the processor of a base station and in the form of hardware, or be stored in a memory of base station and in the form of software, so as to facilitate the processor to call and execute corresponding operations of the foregoing various modules. The processor can be a CPU, a microprocessor, a Single Chip Microcomputer and so on.

A person skilled in the art should understand that the processes of the methods in the above embodiments can be, in full or in part, implemented by computer programs instructing underlying hardware, the programs can be stored in a computer-readable storage medium, the program can include the processes in the embodiments of the various methods when it is being executed. The storage medium can be a disk, a CD, a Read-Only Memory (ROM) and a Random Access Memory (RAM) and so on.

The different technical features of the above embodiments can have various combinations which are not described for the purpose of brevity. Nevertheless, to the extent the combining of the different technical features do not conflict with each other, all such combinations must be regarded as being within the scope of the disclosure.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of detecting a Denial of Service (DoS) or a Distributed Denial of Service (DDoS) attack, comprising:
    acquiring historical traffic data of a service in a preset time period, wherein the historical traffic data is correspondence data between an overall traffic of the service and time;
    calculating, based on the historical traffic data of different time intervals, an overall traffic threshold data of the service corresponding to different time intervals; wherein the historical traffic data of the time interval quantitively corresponds to the overall traffic threshold data of the service;
    determining a time interval corresponding to the historical traffic data, and identifying an overall traffic threshold according to the determined time interval;
    acquiring, during the determined time interval, new traffic data of the service;
    comparing the new traffic data with the identified overall traffic threshold;
    determining, for a preset period of time, the new traffic data exceeds the overall traffic threshold, and performing an attack detection to the service, wherein the performing an attack detection to the service comprises:
    locating abnormal time information when attack traffic occurs;
    acquiring module traffic data of each service module contained in the service corresponding to the abnormal time information; and
    comparing the acquired module traffic data with module traffic threshold calculated in advance corresponding to the abnormal time information, and determining a service module identifier that exceeds the module flow threshold;
    wherein the module traffic threshold corresponding to the abnormal time information is calculated according to the historical traffic data of each service module.

2. The method according to claim 1, wherein the overall traffic threshold data of the service corresponding to different time intervals is acquired by calculation according to the historical traffic data of the service and computing resource data allocated for the service, wherein the larger the historical traffic data of the service, the larger the computing resource data allocated for the service, and the larger the acquired overall traffic threshold data of the service.

3. The method according to claim 1, further comprising:
    collecting correspondence relation data of historical traffic value of the service and the time;
    setting adjacent historical traffic rate values with a difference therebetween being less than a preset value as interval traffic values in the same time interval; and
    calculating an average traffic value of the interval traffic values, and determining the overall traffic threshold of the time interval according to the average traffic value.

4. The method according to claim 2, wherein after the acquiring an overall traffic threshold data of the service corresponding to different time intervals calculated according to historical traffic data of the service; wherein the larger the historical traffic data of the time interval, the larger corresponding overall traffic threshold data of the service, the method further comprises:
    acquiring the computing resource data allocated for the service, and determining a maximum traffic threshold according to the computing resource data; and
    adjusting the overall traffic threshold data of the service corresponding to the different time intervals according to the determined maximum traffic threshold.

5. The method according to claim 1, further comprising:
    acquiring attribute information of a newly added service module when monitoring that the newly added service module is provided in the service, wherein the attribute information comprises type information and duration information;
    acquiring newly added traffic threshold data configured for the newly added service module according to the type information; and
    adjusting the overall traffic threshold of the time interval corresponding to the duration information according to the newly added traffic threshold data.

6. A server comprising a processor; and a memory storing instructions, which, when executed by the processor, cause the processor to perform steps comprising:
    acquiring historical traffic data of a service in a preset time period, wherein the historical traffic data is correspondence data between an overall traffic of the service and a time;
    calculating, based on the historical traffic data of different time intervals, an overall traffic threshold data of the service corresponding to different time intervals; wherein the historical traffic data of the time interval quantitively corresponds to the overall traffic threshold data of the service;
    determining a time interval corresponding to the historical traffic data,
and identifying an overall traffic threshold according to the determined time interval; and
    acquiring, during the determined time interval, new traffic data of the service;
comparing the new traffic data with the identified overall traffic threshold; determining, for a preset period of time, the new traffic data exceeds the overall traffic threshold, and
    performing an attack detection to the service when a duration for which the traffic data keeps exceeding the overall traffic threshold exceeds a preset value, wherein the performing an attack detection to the service comprises:
    locating abnormal time information when attack traffic occurs;
    acquiring module traffic data of each service module contained in the service corresponding to the abnormal time information; and comparing the acquired module traffic data with module traffic threshold calculated in advance corresponding to the abnormal time information, and determining a service module identifier that exceeds the module flow threshold;

wherein the module traffic threshold corresponding to the abnormal time information is calculated according to the historical traffic data of each service module.

7. The server according to claim 6, wherein the overall traffic threshold data of the service corresponding to different time intervals is acquired by calculation according to the historical traffic data of the service and the computing resource data allocated for the service, wherein the larger the historical traffic data of the service, the larger the computing resource data allocated for the service, and the larger the acquired overall traffic threshold data of the service.

8. The server according to claim 6, wherein the attack detection to the service performed by the processor comprises:

locating abnormal time information when attack traffic occurs;

acquiring module traffic data of each service module contained in the service corresponding to the abnormal time information; and comparing the acquired module traffic data with module traffic threshold calculated in advance corresponding to the abnormal time information, and determining a service module identifier that exceeds the module flow threshold;

wherein the module traffic threshold corresponding to the abnormal time information is calculated according to the historical traffic data of each service module.

9. The server according to claim 6, wherein the processor further performs the steps of:

collecting correspondence relation data of historical traffic value of the service and the time;

setting adjacent historical traffic rate values with a difference therebetween being less than a preset value as interval traffic values in the same time interval; and calculating an average traffic value of the interval traffic value, and determining the overall traffic threshold of the time interval according to the average traffic value.

10. The server according to claim 7, wherein after the acquiring an overall traffic threshold data of the service corresponding to different time intervals calculated according to historical traffic data of the service; wherein the larger the historical traffic data of the time interval, the larger corresponding overall traffic threshold data of the service, the processor further performs the steps of:

acquiring the computing resource data allocated for the service, and determining a maximum traffic threshold according to the computing resource data; and adjusting the overall traffic threshold data of the service corresponding to different intervals according to the determined maximum traffic threshold.

11. The server according to claim 6, wherein the processor further performs the steps of:

acquiring attribute information of a newly added service module when monitoring that the newly added service module is provided in the service, wherein the attribute information comprises type information and duration information;

acquiring a newly added traffic threshold data configured for the new service module according to the type information; and adjusting the overall traffic threshold of the time interval corresponding to the duration information according to the newly added traffic threshold data.

12. At least one non-transitory computer-readable storage medium storing computer-readable instructions that, when executed by at least one processors, cause the at least one processor to perform steps comprising:

acquiring historical traffic data of a service in a preset time period, wherein the historical traffic data is correspondence data between an overall traffic of the service and time;

calculating, based on the historical traffic data of different time intervals, an overall traffic threshold data of the service corresponding to different time intervals; wherein the historical traffic data of the time interval quantitively corresponds to the overall traffic threshold data of the service;

determining a time interval corresponding to the historical traffic data, and identifying an overall traffic threshold according to the determined time interval; and acquiring, during the determined time interval, new traffic data of the service;

comparing the new traffic data with the identified overall traffic threshold;

determining, for a preset period of time, the new traffic data exceeds the overall traffic threshold; and performing an attack detection to the service, wherein the performing an attack detection to the service comprises:

locating abnormal time information when attack traffic occurs;

acquiring module traffic data of each service module contained in the service corresponding to the abnormal time information; and comparing the acquired module traffic data with module traffic threshold calculated in advance corresponding to the abnormal time information, and determining a service module identifier that exceeds the module flow threshold;

wherein the module traffic threshold corresponding to the abnormal time information is calculated according to the historical traffic data of each service module.

* * * * *